United States Patent Office 3,492,341
Patented Jan. 27, 1970

3,492,341
ESTERIFICATION OF OLEFINS WITH A MORDENITE TYPE CRYSTALLINE ALUMINOSILICATE CATALYST
Alvin E. Trevillyan, Glenwood, Ill., assignor to Sinclair Research, Inc., New York, N.Y., a corporation of Delaware
No Drawing. Filed Aug. 19, 1966, Ser. No. 573,460
Int. Cl. C07c 67/04, 69/14; B01j 11/32
U.S. Cl. 260—497                5 Claims

ABSTRACT OF THE DISCLOSURE

There is disclosed a process for preparing carboxylic acid esters. A monoolefin containing about 1 to 8 carbon atoms is reacted with a carboxylic acid containing from about 1 to about 20 carbon atoms at a temperature of about 100° to 800° F. The reaction is carried out in the presence of a catalytic amount of a mordenite type crystalline alumino silicate catalyst in predominantly the hydrogen form.

This invention relates to an improved method for the preparation of esters from the reaction of monoolefin hydrocarbons and carboxylic acids. More particularly, this invention concerns the use of a particular crystalline alumino silicate catalyst which demonstrates a high activity for promoting the reaction of olefins with carboxylic acids.

The reaction of carboxylic acids with monoolefins to form the corresponding ester is well known. Various materials are known to catalyze this type of reaction, such as mineral acids, molybdic acid type catalysts and ion exchange resins. While these catalysts are reasonably active, they cannot be regenerated. Furthermore, these strong acid type catalysts are corrosive to processing equipment and although this may not be excessive in terms of equipment life, the metals resulting from the corrosion hasten the catalyst deactivation. Other catalysts which are well known for esterifying monoolefins with carboxylic acids include mixtures of various refractory metal oxides, such as silica-alumina and zeolites, see for example U.S. Patents 3,085,108 and 3,096,365. Both of these patents disclose the use of various silica-alumina catalysts, broadly including zeolites, in the esterification of a monoolefin with a carboxylic acid to produce the corresponding ester. However, the metal oxide catalysts are generally inferior to the strong acid catalyst and their activity must be promoted by an acid pretreatment. In any event, the maximum yield of the ester achieved using the metal silicate catalyst disclosed in these U.S. patents is only about 65%. Accordingly, there is a need for an improved catalyst system for the preparation of esters by reacting monoolefins with carboxylic acids.

It has been discovered by the present invention that particular crystalline alumino silicates can be used as effective catalysts in the esterification of monoolefins with carboxylic acids. These particular catalysts demonstrate a high activity for the esterification reaction, and while they possess very strong acid catalytic sites, they do not have the corrosive characteristics of conventional acid catalysts. Thus, the absence or reduction of metal derived from corrosion gives these catalysts increased life. In an added feature, these catalysts may be regenerated by conventional burning techniques when their activity reaches a level which makes the operation uneconomical due to carbon fouling. Of course, the ability to regenerate the catalyst system makes the instant process economically more desirable than prior art processes. A particular advantage of the present process may be the formation of practically no side reaction products under moderate reaction conditions, thereby facilitating the recovery and re-employment of the unconverted reactants. Thus, for example, when isobutylene and acetic acid were contacted under mild reaction conditions, the reactor effluent gases were almost entirely composed of only the desired ester, and the unconverted olefin and acid. There has been no evidence of polymerization or of saturation of the olefin to isobutane.

According to the process of the present invention, a monoolefin is reacted with a carboxylic acid in the presence of a natural or synthetic crystalline alumino silicate catalyst known as mordenite at a temperature of about 100 to 800° F., to produce high yields of the corresponding ester. Either batch or continuous systems may be employed in using the catalyst of the present invention, although the continuous flow process is preferred due to the economic considerations.

The olefins which can be used in the process of the present invention include the monoolefins containing from 1 to about 8 carbon atoms. Examples of suitable alkenes include, ethylene, propylene, butylene, isobutylene,, 2-ethyl-2-pentene, 2-propyl-2-butene, 2-methyl-2-pentene, 2-isopropyl-2-butene, 1-butene, 2-butene, 2-pentene, 2-hexene, 3-methyl-1-butene, 2-methyl-1-butene, 2,4,4-trimethyl-1-butene, 2-ethyl-1-pentene, 2-methyl-1-pentene, 2-propyl-1-butene, 2-isopropyl-1-butene, 2-methyl-2-hexene, and the like. As a class the tertiary olefins, i.e. the olefins in which one of the carbon atoms linked by the double bond is attached to two other carbon atoms, are the most reactive and are the preferred class of olefinic starting materials of the present process. Thus, isobutylene is especially useful in the process of the present invention.

The olefinic starting material may be individual compounds, a mixture of olefins or a mixture containing olefins in the presence of inert substances, such as, paraffins, including cycloparaffins, and the like, and can be obtained from pure sources or from dilute refinery streams. The process may be readily adapted to the conversion of olefin containing mixtures, such as cracking process effluents, to commercially desirable mixed esters.

The carboxylic acids used in the process of the present invention depends upon the particular product desired and generally include monocarboxylic acids containing 1 to about 20 carbon atoms and more usually containing 1 to about 12 carbon atoms. Polycarboxylic acids containing two or more carboxylic acid radicals and 2 to 12 or more carbon atoms may also be employed to form the esters of the present invention. The carboxylic reactant can also contain nonreactive substituents in place of the hydrogen atom. Typical of the carboxylic acids which can be used in the present process include formic acid, acetic acid, monochloroacetic acid, oxalic acid, propionic acid, malonic acid, butyric acid, isobutyric acid, maleic acid, valeric acid, isovaleric acid, caproic acid, adipic acid, benzoic acid, 2-ethyl hexanoic acid, octanoic acid, phthalic acid, cyclohexane carboxylic acid, sebacic acid, lauric acid, palmitic acid, stearic acid, arachidic acid, etc. The aliphatic acids are the preferred class of carboxylic acids, especially fatty acids, e.g. lower fatty acids.

As previously mentioned, the catalyst employed in the process of this invention is a particular form of the crystalline alumino silicates known as mordenite, see U.S. Patent No. 3,190,939. While mordenite is naturally-occurring, a synthetic mordenite known as Zeolon is also available commercially. Mordenite is characterized by its high silicon to aluminum ratio of about 5:1 and its crystal structure with pore sizes in the range of 5 to 14 angstrom units. The composition of mordenite as given in Kirk-Othmer, "Encyclopedia of Chemical Technology," vol.

12, page 297, is (Ca, Na$_2$)Al$_2$Si$_9$O$_{22}$—6H$_2$O. The proposed structure is one in which the basic building block is a tetrahedron consisting of one silicon or aluminum atom surrounded by four oxygen atoms. The crystal is made up of chains of four-and-five-membered rings of these tetrahedra. These four-and-five-membered rings are believed to give the structure its stability. The chains are linked together to form a network having a system of large parallel channels interconnected by small cross channels. Rings of 12 tetrahedra form the large channels. Other synthetic crystalline alumino silicates also have such 12-membered rings but have interconnected cages whereas the mordenite has parallel channels of uniform diameter. For example, synthetic faujasite, which has the formula Na$_3$Al$_3$Si$_4$O$_{14}$, is characterized by a three-dimensional array of pores which consist of 12–13 A. cages interconnected through 8–9 A. windows.

For use as a catalyst in the process of the present invention, the sodium ions in the sodium form of mordenite can be converted to the hydrogen form, which is often referred to as the acid form. Conversion of the sodium form to the hydrogen form can be achieved either by the direct replacement of sodium ions with hydrogen ions or by replacement of sodium ions with ammonium ions followed by decomposition of the ammonium form by calcination. The predominant amount and even at least about 95%, and preferably at least about 99%, of the alkali metal is removed by the ion-exchange. Chemical analysis of the calcined product of the ammonium form of mordenite shows that essentially complete decomposition of the ammonium ion had occurred, yet the X-ray pattern of the product was the same as that of the original ammonium form. Thus, no attack on the crystalline alumino silicate lattice was detected.

The hydrogen form of mordenite is the preferred catalyst for the esterification process of the present invention. However, minor amounts of metals or other promoters might be present in the hydrogen form of mordenite catalyst which may enhance the catalytic activity and/or stability. This can be done by ion exchange or impregnation, for example, by contacting the ammonium form of mordenite with a solution of a salt of the particular metal desired, followed by calcination or by incorporating the metals directly into the hydrogen form of mordenite by impregnation or ion exchange with a metal salt solution.

The process of the present invention is conducted at temperatures of about 100 to 800° F., preferably about 200 to 500° F., and at a pressure which may often vary from about atmospheric to 1000 p.s.i.g., preferably about 100 to 400 p.s.i.g. In a flow system, the weight hourly space velocity (WHSV), of the combined feeds may vary widely and can be about 0.1/1 to 10/1, often about 0.5/1 to 5/1. The concentration of olefin in the olefin feed stream may vary from about 1 to 100%, preferably about 10 to 100%. A typical carboxylic acid to olefin ratio may vary from about 0.1/1 to 10/1, preferably about 0.2/1 to 5/1.

Example I illustrates an esterification process using the mordenite catalyst of the present invention. Example II illustrates an esterification reaction using a different-crystalline alumino silicate.

EXAMPLE I 50 cc. (0.8 mole) of glacial acetic acid and 5 gm. of hydrogen form Zeolon H mordenite catalyst were placed in a 300 cc. autoclave containing a stirrer. The autoclave was sealed and 24 cc. of isobutylene (0.26 mole) was added from a pressurized blow case. The reaction was carried out for 6 hrs. at a temperature of about 265° F. and stirred continually at 1000 r.p.m. After cooling over night the mixture was removed from the autoclave and filtered. The product mixture was then analyzed and showed a 75% yield of butyl acetate, the remaining constituents consisting of a mixture of unreacted isobutylene and acetic acid.

EXAMPLE II

To a 300 cc. autoclave containing a stirrer was added 24 grams (0.4 mole) of glacial acetic acid and 2.5 grams of a powdered synthetic faujasite crystalline alumino silicate catalyst having a silicia to alumina mole ratio of about 4–5 to 1. After the autoclave was sealed, 75 cc. (0.8 mole) of liquid isobutylene were introduced from a pressurized blowcase. The mixture was stirred at about 1000 r.p.m. and heated to a temperature of about 302° F. for 7 hours. After cooling over night, the mixture was removed from the autoclave and filtered. The product mixture was then analyzed and showed a 5% yield of butyl acetate.

As can be readily observed the use of the hydrogen form mordenite catalyst (Example I) rather than other types of crystalline alumino silicates, as exemplified by Example II, in the esterification of monoolefins can result in a substantial increase in the yield of the corresponding ester (75% compared to 5%).

It is claimed:
1. In a process for preparing carboxylic acid esters which comprises reacting a monoolefinic hydrocarbon containing about 1 to 8 carbon atoms with a hydrocarbon carboxylic acid containing from 1 to about 20 carbon atoms at a temperature of about 100 to 800° F. in the presence of a catalyst, the improvement which comprises conducting said reaction in the presence of a catalytic amount of a mordenite type crystalline aluminosilicate catalyst in predominantly the hydrogen form.

2. In the improvement of the process of claim 1 wherein at least about 95% of the mordenite catalyst is the hydrogen form.

3. In a process for preparing carboxylic acid esters which comprises reacting a tertiary monoolefinic hydrocarbon containing from 1 to about 8 carbon atoms with a lower fatty carboxylic acid containing from 1 to about 12 carbon atoms at a temperature of about 200 to 500° F. in the presence of a catalyst, the improvement which comprises conducting said reaction in the presence of a catalytic amount of a mordenite type crystalline aluminosilicate catalyst in the hydrogen form.

4. In the process of claim 3 wherein the monoolefinic hydrocarbon is isobutylene and the carboxylic acid is glacial acetic acid.

5. In a process for preparing butyl acetate which consists essentially of reacting isobutylene with glacial acetic acid at a temperature of about 200 to 500° F. in the presence of a catalyst, the improvement which comprises conducting said reaction in the presence of a catalytic amount of a mordenite type crystalline aluminosilicate catalyst in the hydrogen form.

References Cited

UNITED STATES PATENTS

| | | | |
|---|---|---|---|
| 3,096,365 | 7/1963 | Heisler | 260—497 |
| 3,278,589 | 10/1966 | Sriabine | 260—497 |

FOREIGN PATENTS

| | | |
|---|---|---|
| 905,854 | 9/1962 | Great Britain. |

LORRAINE A. WEINBERGER, Primary Examiner

V. GARNER, Assistant Examiner

U.S. Cl. X.R.

252—416, 450, 455; 260—468, 410.9, 475, 476, 485, 487